J. O. FLYNN.
GAUGE FOR HANDSAWS.
APPLICATION FILED APR. 23, 1921.

1,409,048. Patented Mar. 7, 1922.

John O. Flynn
INVENTOR

BY Victor J. Evans
ATTORNEY

UNITED STATES PATENT OFFICE.

JOHN O. FLYNN, OF PHILADELPHIA, PENNSYLVANIA.

GAUGE FOR HANDSAWS.

1,409,048.  Specification of Letters Patent.  Patented Mar. 7, 1922.

Application filed April 23, 1921. Serial No. 464,041.

*To all whom it may concern:*

Be it known that I, JOHN O. FLYNN, a citizen of the United States, residing at Philadelphia, in the county of Philadelphia and State of Pennsylvania, have invented new and useful Improvements in Gauges for Handsaws, of which the following is a specification.

This invention relates to a gauge for hand saws, and the object is to provide a device of particular construction which may be set in a given position for determining the depth of the cut to be made.

A further object is to provide a gauge which shall include a plurality of bars, one of the bars being positioned on either side of the blade of the saw, a plurality of worked members pivotally connected with the bars, and clamping devices for retaining the aforesaid elements in a given position, in order that the depth of the cut may be limited to an extent previously determined.

With the foregoing and other objects in view, the invention consists in the novel construction and arrangement of elements described and claimed, it being understood that modifications may be made within the scope of the claims, without departing from the spirit of the invention.

Figure 1:
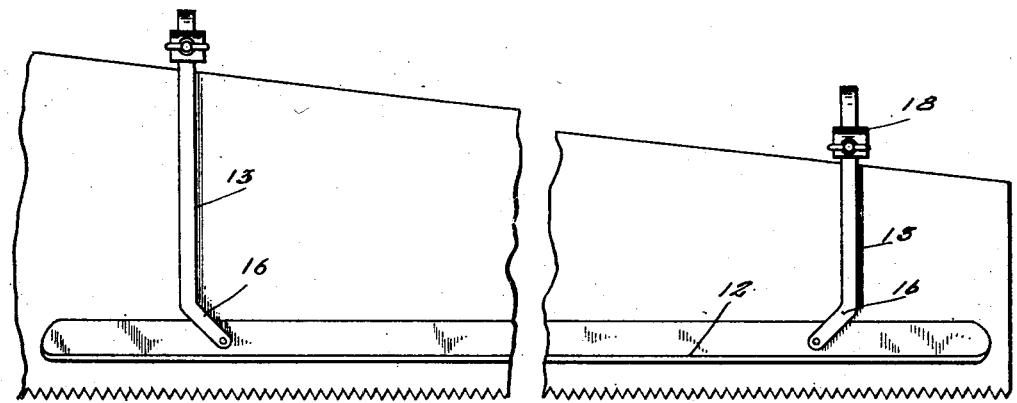
Figure 1 is a view of the device in operative position, and in side elevation.
Figure 2:
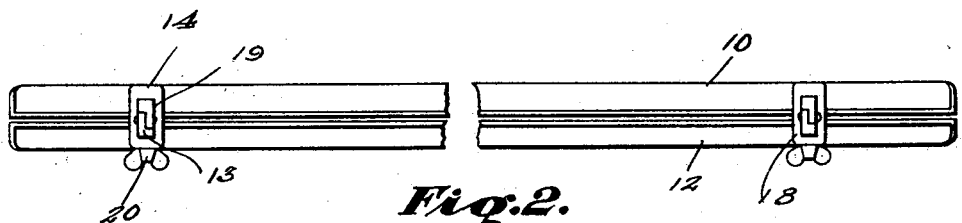
Figure 2 is a top plan view.

In the drawings, the elements which determine the depth of the cut are designated 10 and 12, being of angle bar construction, and pivotally connected with these bars are yokes each comprising an element or leg 13 and a corresponding element 14.

The legs 13 and 14 are pivotally connected at 15, and the lower ends of the legs, as the device appears in Figure 1, may be offset as shown at 16.

Figure 3:
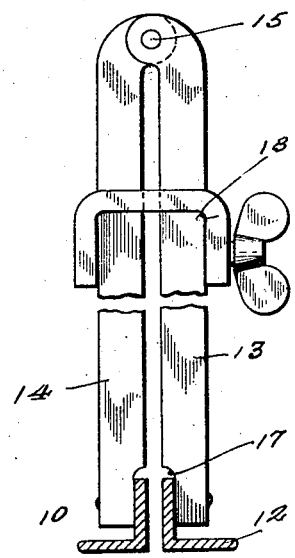
Figure 3 is a vertical section through the gauge bars, the yokes being in elevation.

One leg of each yoke is encountered with the adjacent surface of the saw blade, and in order to permit of proper surface contact, the cutaway portions 17 are provided, so that the adjacent flange of the angle bar 10 or 12, as the case may be, may be connected as shown in Figure 3.

Clamps 18 are each provided with an approximately rectangular opening 19, the clamps passing over the yokes as shown, and being retained, in each case, by a thumb screw 20.

The position of the yokes and therefore of the gauge bars 10 and 12 may be varied for determining the depth of the cut, the clamps then being tightened for maintaining the adjustment desired.

The openings through the clamps are proportioned to cause the clamps to snugly engage the pivoted members when spaced apart by the blade of the saw.

What is claimed is:

1. A gauge for a hand saw, comprising a plurality of bars, adapted to lie in parallel relation on opposite sides of a saw blade, yokes each comprising a plurality of pivotally connected legs, one leg of each yoke being connected with one of the bars and a clamping device surrounding each yoke and adapted to force the legs of said yoke throughout their length into positive contact with the adjacent surface of the saw blade.

2. A gauge for a hand saw, comprising a plurality of parallel bars, yokes each comprising a plurality of pivotally connected members, of uniform cross section, corresponding ends of said members having pivotal connection with the bars, and the inner surfaces of the members of the yokes being flush with the inner surfaces of the bars, and clamps, each comprising a body having an approximately rectangular opening through which the members of a given yoke pass, said opening being proportioned to cause the sides of the clamps to snugly embrace the pivoted members when spaced apart by the saw blade, and a threaded tension device passing through the clamp and engaging the yoke with which the clamp is associated.

In testimony whereof I affix my signature.

JOHN O. FLYNN.